United States Patent [19]
Watkins et al.

[11] Patent Number: 5,937,614
[45] Date of Patent: *Aug. 17, 1999

[54] BAG SEALING APPARATUS

[76] Inventors: David Leonard Watkins, 3 Peacock Court, Chapel Street, Wellesbourne, Warwickshire, CV35 9QX, United Kingdom; Wilfred Leonard Watkins, 55 Farmer Ward Road, Kenilworth, Warwickshire, CV8 2DJ, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/687,394
[22] PCT Filed: Feb. 1, 1995
[86] PCT No.: PCT/GB95/00205
  § 371 Date: Nov. 12, 1996
  § 102(e) Date: Nov. 12, 1996
[87] PCT Pub. No.: WO95/21092
  PCT Pub. Date: Aug. 10, 1995

[30] Foreign Application Priority Data

Feb. 1, 1994 [GB] United Kingdom ............... 9401913

[51] Int. Cl.[6] .................................................. B65B 31/02
[52] U.S. Cl. ................................ 53/79; 53/472; 53/374.8
[58] Field of Search ............................... 53/403, 407, 79, 53/472, 139.5, 238, 155, 511, 374.8, 375.6

[56] References Cited

U.S. PATENT DOCUMENTS

| | | | |
|---|---|---|---|
| 3,389,534 | 6/1968 | Pendleton | 53/79 |
| 3,575,757 | 4/1971 | Smith . | |
| 3,667,593 | 6/1972 | Pendleton . | |
| 3,817,803 | 6/1974 | Horsky | 53/403 X |
| 3,938,298 | 2/1976 | Luhman et al. . | |
| 4,215,524 | 8/1980 | Saylor . | |
| 4,262,472 | 4/1981 | Soeda et al. . | |
| 4,580,392 | 4/1986 | Lagerstedt et al. . | |
| 4,757,668 | 7/1988 | Klinkel et al. . | |
| 4,793,121 | 12/1988 | Jamison . | |
| 4,869,048 | 9/1989 | Boeckmann . | |
| 4,961,302 | 10/1990 | David . | |
| 5,042,663 | 8/1991 | Heinrich . | |
| 5,369,941 | 12/1994 | Rapparini . | |
| 5,660,662 | 8/1997 | Testone | 53/403 X |

Primary Examiner—Linda Johnson
Attorney, Agent, or Firm—Clifford W. Browning; Woodard, Emhardt, Naughton Moriarty & McNett

[57] ABSTRACT

Bag sealing apparatus comprises a compressed air source which pumps air through a supply pipe towards an opening in a bag. Bag material is advanced by rollers from a roll. The material is in the form of two layers open at one side. The supply pipe extends between the layers through the open side and the open side is sealed by heat sealing by two side members. Each of the rollers defines a circumferential recess and the two recesses together receive the supply pipe. The apparatus further comprises heat sealing elements for sealing the opening in the bag and spring mounted clamp parts for clamping the bag downstream of the sealing elements to reduce fluid back pressure from the downstream bag.

13 Claims, 2 Drawing Sheets

BAG SEALING APPARATUS

The invention relates to bag sealing apparatus.

It is known to produce air bags, or air pillows, for use in packaging goods to protect them. Thus, a delicate article might be surrounded with air pillows in a cardboard box to protect it from damage during transport. It is known to make such air pillows from heat sealable plastics material and the bags are produced in a strip with each bag being heat sealed from the next. The known sealing method is unreliable however as the back pressure from air in the bag as it is being sealed tends to unseal the bag.

According to one aspect of the invention there is provided bag sealing apparatus comprising a fluid source to pump fluid towards an opening in a bag, means for sealing the opening in the bag and means for clamping the bag downstream of the sealing means to reduce fluid back pressure.

In this way, as the bag is clamped downstream of the sealing means, the back pressure does not operate on the seal and a good seal can be reliably ensured. Also the quantity of fluid introduced into the bag can be closely controlled as fluid cannot escape past the clamping means during sealing.

The fluid source may be a source of compressed gas, preferably compressed air.

The sealing means may seal the bag in any suitable way, such as by adhesive or mechanical means, but preferably the sealing means comprises heat sealing means.

The clamping means may comprise a resilient member which is urged against the bag. The resiliency aids in providing a fluid tight seal. Preferably, the clamping means comprises two resilient clamping members arranged on opposite sides to clamp a bag between them.

Preferably, the clamping means is arranged to clamp the bag before the sealing means starts to seal the bag.

The clamping means and sealing means may be mounted separately, but in one embodiment, a clamping member of the clamping means and a sealing member of the sealing means are mounted together on a mounting member. Preferably, on the mounting member, the clamping member is resiliently mounted ahead of the sealing member so as to engage the bag before the sealing member. This ensures that the bag is clamped before the sealing operation commences. Preferably, a second mounting member is provided which mounts a second clamping member and/or a second sealing member. Conveniently, only one of the first and second mounting members is movable, but in another embodiment both of the first and second mounting members may be movable towards and away from each other. The or each mounting member is preferably moved pneumatically.

The fluid source may be arranged to pump fluid through a fluid supply pipe.

The apparatus may be arranged to operate in a cycle. The material for the bag may be provided as a strip which is advanced by advancing means through the apparatus.

The means for advancing the bag material may take any suitable form and preferably comprises two rollers side by side between which the material passes. Preferably, at least one of the rollers includes a circumferential recess and the recess or both recesses together receive the supply pipe.

The bag material may be in the form of two layers open at one side and the fluid supply pipe may extend between the layers through the open side. Means is preferably provided for sealing the open side.

According to another aspect of the invention there is provided apparatus for making a bag comprising means for advancing material for making a bag from a store, the material being in the form of two layers open at one side, a supply pipe extending between the layers through the open side and means for sealing the open side.

This arrangement allows the bag to be filled directly and without complication.

The material may be open at both sides but preferably is open on only one side. The open side of the material is preferably sealed upstream of the end of the supply pipe. The side sealing means may take any suitable form and may comprise heat sealing means. The side sealing means preferably comprises a member which is movable towards and away from the side of the material. The apparatus preferably includes bag sealing means for sealing the bag after the bag has been filled from the supply pipe. The bag sealing means preferably lies downstream of the advancing means. The bag sealing means preferably includes a member which is movable towards and away from the material. The bag sealing means and the side sealing means are preferably rigidly connected and moved together. The bag sealing means member and/or the side sealing means member may be moved by pneumatic means.

The means for advancing the bag material may take any suitable form and preferably comprises two rollers side by side between which the material passes. Preferably, at least one of the rollers includes a circumferential recess and the recess or both recesses together receive the supply pipe.

According to a further aspect of the invention there is provided apparatus for making a bag comprising a compressed fluid supply pipe and two rollers arranged side by side and between which material for making a bag passes, one or both of the rollers including a circumferential recess and the recess or both recesses together receiving the supply pipe.

In this way the amount of fluid entering the bag can be precisely controlled as backflow past the rollers is limited. Preferably the supply pipe substantially fills the recess or both recesses. The bag material may be provided as a strip. Preferably bag sealing means is provided immediately past the rollers. Thus, the bag sealing will leave only a minimal amount of fluid between the seal and the rollers. Preferably clamping means is provided for clamping a bag downstream of the sealing means to reduce fluid back pressure.

Two embodiments of the invention will now be described by way of example and with reference to the accompanying drawings, in which.

Figure 1:
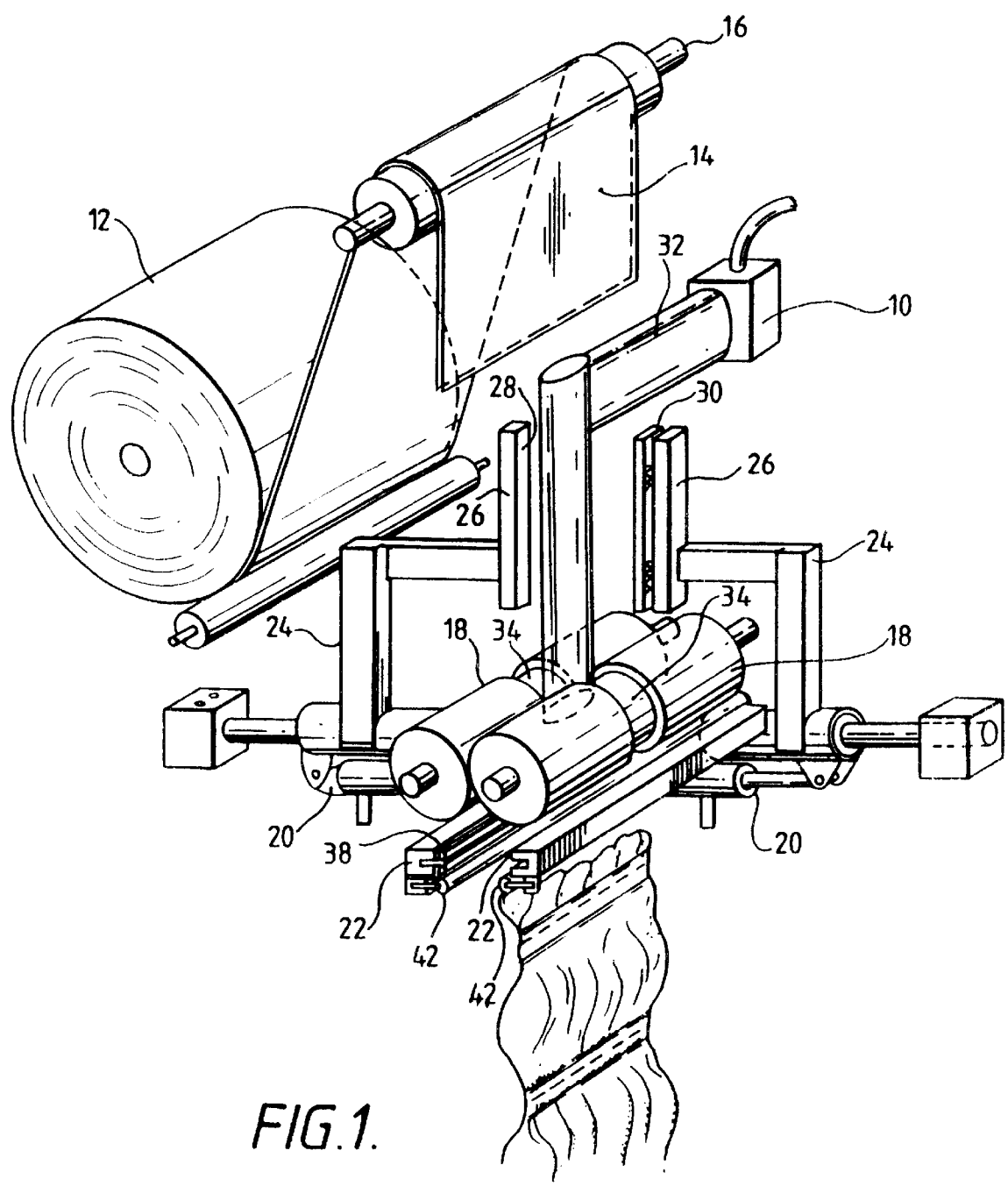
FIG. 1 is a perspective view of the apparatus of the first embodiment.

FIG. 1 shows the apparatus 10 of the first embodiment. A roll of bag material 12 is stored on a spindle and material 14 from the roll passes over an upper roller 16 and downwardly between two advancing rollers 18 which grip the material and are driven by a motor (not shown) to advance the material in steps. The material is in two layers with a fold on one side and being open at the other side.

A pneumatic source powers two pistons 20 provided beneath the advancing rollers 18. At the inner end of each piston 20 is connected a bag sealing member 22 parallel to and beneath one of the advancing rollers 18. The outer end of each piston 20 is connected to an arm 24 which extends upwardly past the advancing rollers 18 and inwardly to mount an upright side member 26. One side member 26 includes a heating element 28 and the other side member 26 mounts a sprung mounted part 30. A compressed air supply pipe 32 extends inwardly parallel to the advancing rollers 18 so as to lie between two layers of the material 14 centrally thereof and turns to extend downwardly past the upright members 26 to the advancing rollers 18. Each advancing roller 18 includes a central circumferential recess 34 such that the material and the end of the supply pipe 32 can be received in the recesses 34. The end of the supply pipe 32 does not extend downwardly past the plane containing the axes of the advancing rollers 18.

Figure 2:
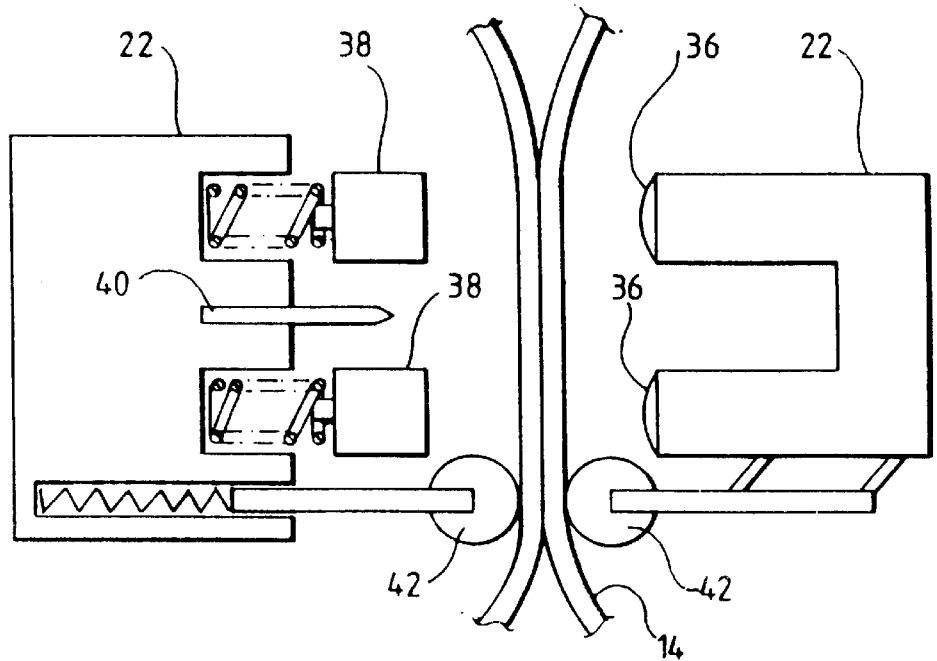
FIG. 2 is a detail side elevation of the heat sealing part of the apparatus of FIG. 1; and, FIG. 3 is the view of FIG. 2 of the second embodiment.

The bag members 22 are shown in detail in FIG. 2. One of the bag members 22 mounts two vertically spaced heating elements 36. The other bag member 22 carries two spring mounted parts 38 opposite the heating elements 36. Between the spring mounted parts 38 is provided a serrated blade 40. Below the heating elements 36, the bag member 22 mounts a projection 42 with a resilient end and a similar projection 42 with a resilient end is spring mounted in an oppositely disposed position on the other bag member 22. These parts are arranged such that when the piston 20 operates to bring the bag members 22 together, the clamping projections 42 will engage first followed by the heating elements 36 and the spring mounted parts 38 followed by the serrated knife 40 engaging the bag.

In use then, the motor which drives the advancing rollers advances in steps. Once the rollers 18 have been advanced and stopped the pistons 20 are operated and the upright elements 26 are brought together at the open side of the material 14. Current is applied to the heating element 28 to heat seal the edges of the material which is urged against the heating element 28 by the spring mounted part 30. At the same time, the members 22 are brought together. As the members 22 are brought together, the clamping projections engage the bag material to close it off and the spring mounted parts 38 then urge the material against the heating elements 36 to heat seal the material in two vertically spaced positions. The serrated knife 40 then engages the bag to perforate between the two seals. The pistons 20 are then operated to retract the members 22 and arms 24 and the advancing rollers 18 are advanced again while compressed air is supplied through the pipe 32. When the cycle has been repeated, the first bag has been created. The bags are created in a strip and can be torn off at the perforated line created by the knife 40.

It is seen that the clamping projections act to close off the area being sealed by the heating element 36 from back pressure from the bag which has just been formed so that the seals which are created are not subjected to that pressure until the seals have been formed and cooled to some degree. In this way a seal is reliably formed.

The supply pipe 32 and the recesses 34 in the rollers 18 are sized and spaced in relation to the thickness of the bag material 14 such that little or no air can escape backwards between the supply pipe 32 and the rollers 18 and thus the amount of air supplied to each bag can be controlled precisely and a uniform series of bags produced.

The supply pipe may supply compressed air at 3 psi. The bag material may be any suitable heat sealable material which provides an air barrier and may be low density polyethylene (LDPE), for example. The sealing contact time may be 1.5 seconds.

Figure 3:
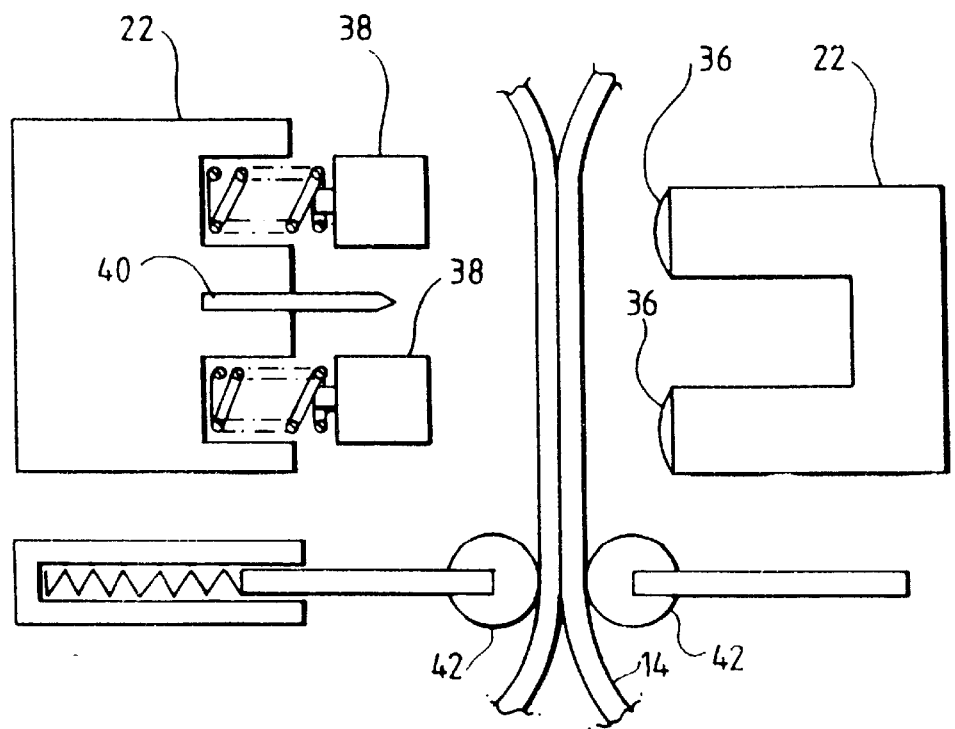

The second embodiment is shown in FIG. 3 and is similar to the embodiment of FIGS. 1 and 2. Only the differences from the first embodiment will be described and the same reference numerals will be used for equivalent features.

The only difference in the second embodiment is that the projections 42 are not provided on the bag members 22 but instead are provided on separately operated rams (not shown). This enables greater and independent control over the delay between bag clamping and bag sealing and cutting. It also makes the heating elements 36 easier to change.

We claim:

1. Bag sealing apparatus for producing bags of gas for protective packing, the apparatus comprising a gas source to pump gas towards an opening in a bag, means for sealing the opening in the bag and means for clamping the bag in an airtight manner downstream of the sealing means to reduce gas back pressure, the clamping means comprising at least one elongate clamping member having a length greater than the width of the bag thereby clamping the bag across substantially its entire width.

2. Apparatus as claimed in claim 1, wherein the gas source is a source of compressed air.

3. Apparatus as claimed in claim 1, wherein the sealing means comprises heat sealing means.

4. Apparatus as claimed in claim 1, wherein the clamping means comprises a resilient member which is urged against the bag.

5. Apparatus as claimed in claim 1, wherein the clamping means comprises two resilient clamping members arranged on opposite sides to clamp a bag between them.

6. Apparatus as claimed in claim 1, wherein the clamping means is arranged to clamp the bag before the sealing means starts to seal the bag.

7. Apparatus as claimed in claim 1, wherein a clamping member of the clamping means and a sealing member of the sealing means are mounted together on a mounting member.

8. Apparatus as claimed in claim 7, wherein on the mounting member, the clamping member is resiliently mounted ahead of the sealing member so as to engage the bag before the sealing member.

9. Apparatus as claimed in claim 7, wherein a second mounting member is provided which mounts one of a second clamping member and a second sealing member.

10. Apparatus as claimed in claim 9, wherein only one of the first and second mounting members is movable.

11. Apparatus as claimed in claim 9, wherein both of the first and second mounting members are movable towards and away from each other.

12. Apparatus as claimed in claim 7, wherein the or each mounting member is moved pneumatically.

13. Apparatus as claimed in claim 1, wherein the apparatus is arranged to operate in a cycle.

\* \* \* \* \*